United States Patent
Eleftheriou et al.

(10) Patent No.: US 8,688,900 B2
(45) Date of Patent: *Apr. 1, 2014

(54) CACHE MEMORY MANAGEMENT IN A FLASH CACHE ARCHITECTURE

(71) Applicant: International Business Machines Corporation, Armonk, NY (US)

(72) Inventors: Evangelos S. Eleftheriou, Rueschlikon (CH); Robert Haas, Rueschlikon (CH); Xiao-Yu Hu, Rueschlikon (CH); Roman A. Pletka, Rueschlikon (CH)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/758,590

(22) Filed: Feb. 4, 2013

(65) Prior Publication Data

US 2013/0145089 A1      Jun. 6, 2013

Related U.S. Application Data

(63) Continuation of application No. 13/080,655, filed on Apr. 5, 2011.

(30) Foreign Application Priority Data

May 28, 2010   (EP) .................................... 10164399

(51) Int. Cl.
*G06F 12/00*   (2006.01)
*G06F 13/00*   (2006.01)
*G06F 13/28*   (2006.01)
*G06F 9/26*    (2006.01)
*G06F 9/34*    (2006.01)

(52) U.S. Cl.
USPC ............ 711/103; 711/119; 711/133; 711/202

(58) Field of Classification Search
USPC ........................ 711/103, 118–119, 133, 202
See application file for complete search history.

(56) References Cited

U.S. PATENT DOCUMENTS 7,613,876 B2 * 11/2009 Bruce et al. ................... 711/113
2002/0184432 A1  12/2002 Ban
(Continued)

FOREIGN PATENT DOCUMENTS

JP        2006023792        1/2006

OTHER PUBLICATIONS

Patent Abstract and Machine Translation for for JP2006023792, published Jan. 26, 2006, 31 pgs.

(Continued)

*Primary Examiner* — Ryan Bertram
(74) *Attorney, Agent, or Firm* — Konrad Raynes Davda & Victor LLP; David W. Victor

(57) ABSTRACT

Provided is a method for managing cache memory to cache data units in at least one storage device. A cache controller is coupled to at least two flash bricks, each comprising a flash memory. Metadata indicates a mapping of the data units to the flash bricks caching the data units, wherein the metadata is used to determine the flash bricks on which the cache controller caches received data units. The metadata is updated to indicate the flash brick having the flash memory on which data units are cached.

9 Claims, 3 Drawing Sheets

(56) References Cited

U.S. PATENT DOCUMENTS

| | | |
|---|---|---|
| 2004/0085849 A1 | 5/2004 | Myoung et al. |
| 2004/0193782 A1 | 9/2004 | Bordui |
| 2004/0230738 A1 | 11/2004 | Lim et al. |
| 2008/0162795 A1 | 7/2008 | Hsieh et al. |
| 2008/0162864 A1* | 7/2008 | Sugumar et al. ............... 711/173 |
| 2008/0177938 A1 | 7/2008 | Yu |
| 2008/0209114 A1* | 8/2008 | Chow et al. ................... 711/103 |
| 2009/0113119 A1 | 4/2009 | Oribe et al. |
| 2009/0164700 A1 | 6/2009 | Chen et al. |
| 2009/0193182 A1* | 7/2009 | Nitta ............................ 711/103 |
| 2009/0327584 A1 | 12/2009 | Tetrick et al. |
| 2010/0017556 A1 | 1/2010 | Chin et al. |
| 2010/0042773 A1 | 2/2010 | Yeh |
| 2011/0082967 A1* | 4/2011 | Deshkar et al. ............... 711/103 |
| 2011/0296085 A1 | 12/2011 | Eleftheriou et al. |

OTHER PUBLICATIONS

T. Kgil et al., "Improving NAND Flash Based Disk Caches", International Symposium on Computer Architecture, 2008, 12 pgs.

T. Kgil et al., "FlashCache: A NAND Flash Memory File Cache for Low Power Web Servers", Advanced Computer Architecture Laboratory The University of Michigan, 2006, 10 pgs.

Office Action dated Jul. 2, 2013, pp. 24, for U.S. Appl. No. 13/080,655, filed Apr. 5, 2011 by inventors E.S. Evangelos, et al.

Notice of Allowance dated Nov. 13, 2013, pp. 15, for U.S. Appl. No. 13/080,655, filed Apr. 5, 2011.

\* cited by examiner

CACHE MEMORY MANAGEMENT IN A FLASH CACHE ARCHITECTURE

CROSS-REFERENCE TO RELATED APPLICATIONS

This application is a continuation of U.S. patent application Ser. No. 13/080,655, filed on Apr. 5, 2011, which claims priority benefits under Title 35, Unites States Code, Section 119(a)-(d) or Section 365(b) from European Patent Application No. EP10164399, filed on May 28, 2010 by Xiao-Yu HU, Evangelos S. ELEFTHERIOU, Robert HAAS, and Roman A. PLETKA, and entitled "CACHE MEMORY MANAGEMENT IN A FLASH CACHE ARCHITECTURE", which U.S. and European applications are incorporated herein by reference in their entirety.

BACKGROUND OF THE INVENTION

1. Field of the Invention

The invention relates to the field of flash cache architecture for storage system, and specifically to a method of management of cache memory.

2. Description of the Related Art

Solid state devices and disks (also known as SSDs) provide random Input/Output (I/O) performances and access latencies that are orders of magnitude better than that of rotating hard-disk drives (also known as HDDs). SSDs provide several advantages compared to HDDs: indeed, SSDs significantly reduce power consumption and dramatically improve robustness and shock resistance thanks to the absence of moving parts.

On the other side, SSDs have a much higher cost per GigaByte (GB) compared to HDDs, although the price of SSD is constantly going down. It is anticipated that in the coming years the price gap between SSDs and HDDs remains.

It is widely accepted that the most cost-efficient way to integrate flash into enterprise storage system is to put hot data on flash and cold data on disks. The term hot data refers to information used most frequently, and the term cold data refers to information which is used less frequently. In other words, one puts the hot data on the SSDs which are fastest hardware, and the cold data on HDDs which are less competitive. One way to achieve this is to use flash as a cache extension.

A cache is a fast piece of storage, used for copies of data that normally reside in a larger, slower piece of storage. The cache is used to speed up access to data resident in the slower storage.

In modern enterprise storage system, there is one cache controller (or sometime two for fail-over purpose) that manages the read and write caches for the whole system. The cache controller may be in the form of a powerful CPU together with Dynamic Random Access Memory (also known as DRAM) or battery-backed DRAM as data store. The cache controller further implements typical cache replacement algorithms such as LRU, ARC, or others.

Most SSDs use flash memories, notably because flash memories ensure data persistence. However, a flash memory does not support high-performance update in place, thus flash memory normally operates a relocate-on-write to boost write performance. In order to support relocate-on-write, flash management functions such as garbage collection and wear leveling have to be implemented by the system.

Several straightforward approaches exist to integrate flash as a cache into enterprise systems. A first one consists in using the flash memory as a raw storage media and implementing flash management functions using an existing cache controller. In practice, the existing cache controller manages the read and write cache of HDDs. Besides the cache replacement algorithm, the cache controller has to manage the flash media (e.g., SSDs) by maintaining metadata for all data chunks cached on flash memory. The metadata is essentially a table showing which host LBA-addressed (Logical Block Addressing-addressed) data chunk is stored on which flash page addressed by a physical block address (PBA). The cache controller has to manage this address mapping table, perform relocate-on-write by doing garbage collection or de-staging, which may consume a significant portion of computation resources. The major drawback of this architecture is that it does not scale well with the size of flash space.

Another straightforward approach is to use existing SSDs as cache extensions. In this architecture, flash memory is managed by a flash controller inside each SSD. The flash controller is transparent to the cache controller and dedicated to flash management functions such as garbage collection and wear leveling. The cache controller can view multiple flash SSDs as an integrated linear collections of pages for cache use (e.g., each page of 4 KB size). The pages are addressed by the cache controller using the LBAs of each SSDs. For cache management purposes, the cache controller maintains a metadata table, mapping a cached host LBA-addressed block to a flash LBA addressed block. One advantage of this architecture is that the cache controller does not need to manage flash memory thanks to the use of flash SSDs. However this architecture does not scale well because the cache controller has to address the entire flash LBA space offered by flash SSDs, which can be huge.

SUMMARY

Provided are a system, method, and computer program product for managing cache memory to cache data units in at least one storage device. A cache controller is coupled to at least two flash bricks, each comprising a flash memory. Metadata indicates a mapping of the data units to the flash bricks caching the data units, wherein the metadata is used to determine the flash bricks on which the cache controller caches received data units. The metadata is updated to indicate the flash brick having the flash memory on which data units are cached.

BRIEF DESCRIPTION OF THE DRAWINGS

A system and a process embodying the invention will now be described, by way of non-limiting example, and in reference to the accompanying drawings, where.

DETAILED DESCRIPTION OF THE EMBODIMENTS

Figure 1:
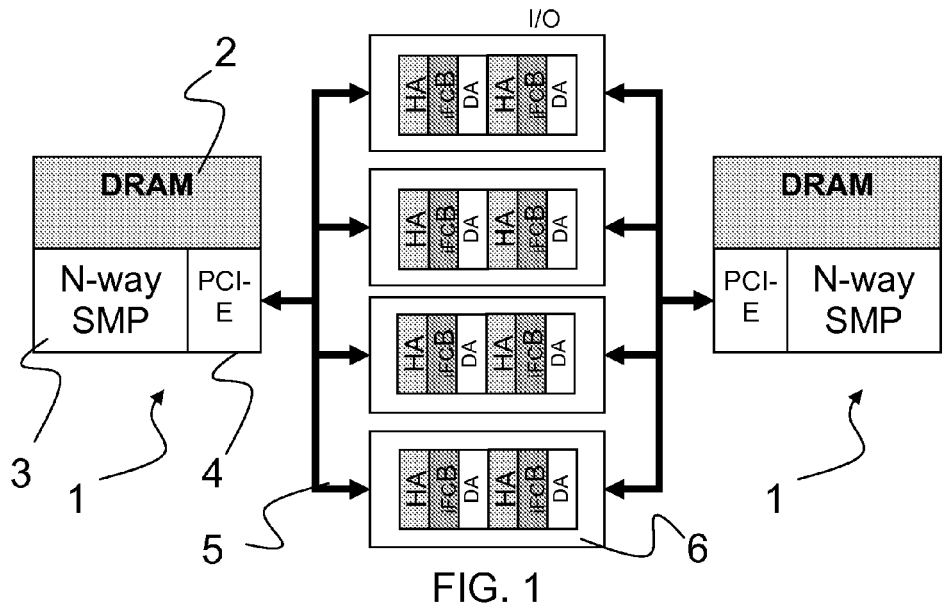
FIG. 1 is an example of an architecture view of a storage system according to the invention.

The described embodiments are directed to a method for managing cache memory in a flash cache architecture. The flash cache architecture comprises a cache controller and at least two flash cache bricks (FCBs). An FCB comprises at least a flash memory and preferably a flash controller. The method of the embodiments maintains at the cache controller metadata indicating on which FCB data corresponding to the metadata are cached or expected to be cached.

Hence, the embodiments are directed to a flash cache architecture e.g., for enterprise storage systems. In a storage system (or more generally a storage system architecture), according to the embodiments, the cache controller manages which data has to be cached, and if cached, on which flash cache brick (FCB). Therefore, an FCB is a cache extension of the storage system: read/write cached data may be stored on the flash memory of the FCB. Advantageously, the management of the cache memory is more efficient, and the scalability of the flash cache architecture is improved.

Embodiments provide a method for managing cache memory in a flash cache architecture comprising a cache controller and at least two flash cache bricks, a flash cache brick comprising at least a flash memory and preferably a flash controller. The method maintains at the cache controller metadata indicating on which flash cache bricks data corresponding to the metadata are cached or expected to be cached.

In embodiments, the method for managing cache memory in a flash cache architecture may comprise one or more of the following features:
  deciding at the cache controller whether to cache given data and updating at the cache controller corresponding metadata, which indicate on which flash cache brick the given data are to be cached;
  deciding at the cache controller whether to cache given data, selecting at the cache controller on which flash cache brick the given data are to be cached, letting the flash controller of the selected flash cache brick decide whether to cache the given data, and updating at the cache controller corresponding metadata, which indicate on which selected flash cache brick (FCB1, FCB2) the given data are to be cached;
  deciding at the flash controller of the selected flash cache brick whether to cache given data further comprises deciding at the flash controller which cached data should be removed to make room for newly cached data;
  deciding at the cache controller whether to cache given data further comprises deciding at the cache controller which cached data should be removed to make room for newly cached data;
  the step of deciding and updating at the cache controller is triggered upon accessing contents of a read/write request;
  the read/write request originates from a host connected to a processor which implements the steps of deciding and updating at the cache controller;
  the steps of maintaining, deciding and updating at the cache controller are implemented by a processor coupled to the cache controller;
  each of the flash cache bricks has no active flash controller, and the metadata maintained at the cache controller indicate where the data corresponding to the metadata are cached or expected to be cached inside the said flash cache brick;
  each of the flash cache bricks has an active flash controller, and wherein in addition to maintaining the metadata at the cache controller, the method further comprises a step, possibly concomitant, of maintaining at a flash cache brick, additional metadata indicating where the data corresponding to the said metadata or additional metadata are cached or expected to be cached inside the said flash cache brick;
  maintaining at the flash controller a LBA-to-PBA mapping table;
  at the step of maintaining at the cache controller, ranges of LBAs are allocated to respective flash cache bricks;
  at the step of maintaining at the cache controller, the ranges of LBAs are dynamically allocated, based on a dynamical parameter such as a workload.

Another embodiment comprises a system for managing cache memory in a flash cache architecture comprising:
  a cache controller or cache controller; and
  at least two flash cache bricks, a flash cache brick comprising at least a flash memory and preferably a flash controller; wherein the system maintains at the cache controller metadata indicating on which flash cache brick data corresponding to the metadata are cached or expected to be cached.

Another embodiment comprises a storage system architecture, comprising the system according to the invention, a host adapted to emit a read/write request, and at least one processor adapted to maintain the cache controller metadata, wherein the system is coupled with the host and with the at least one processor. In a variant embodiment, the storage system architecture further comprises at least one storage device such as a Hard Disk Drive, and the system is coupled with the at least one storage device.

Another embodiment comprises a computer program stored on a computer readable medium, for managing cache memory in a flash cache architecture, comprising code means for causing a computer to perform the methods of the above described embodiments.

FIG. 1 depicts an example of an architecture view of a storage system according to the invention. FIG. 1 shows a storage system (or storage system architecture) having a cache controller 1 that comprises a memory 2 and a microprocessor 3. The memory 2 may be of type Dynamic Random Access Memory (DRAM) and may store programs that are used by the microprocessor 3 to perform the function of the cache controller 1.

The cache controller 1 is connected via an interface 4 to device enclosures 6 through connections 5. The interface 4 may be for example peripheral component interconnect Express (commonly called PCI-E). The interface 4 and the connections 5 to device enclosures 6 may be based on different technologies.

In the embodiment depicted in FIG. 1, two cache controllers are used on the system, e.g., for fail-over purpose. Especially, the depicted architecture involves a multiprocessor computer architecture (also referred as SMP, Symmetric MultiProcessing) where two identical processors are connected to a single shared main memory and are controlled by a single OS instance.

The storage system (or storage system architecture) is comprised of several device enclosures 6. For instance, the storage system may comprise several HDDs in order to form a disk array storage which is connected to one or more device adaptors in the device enclosure. The device enclosure 6 further comprises at least two flash cache bricks (FCB or iFCB). The device enclosure may also comprise host adapters that are connected to hosts. An FCB comprises at least a flash memory and preferably a flash controller. The flash memory is organized in data blocks which are used for storing data. An FCB stores the data to be cached, and is able to manage flash relocate-on-write.

Figure 2:
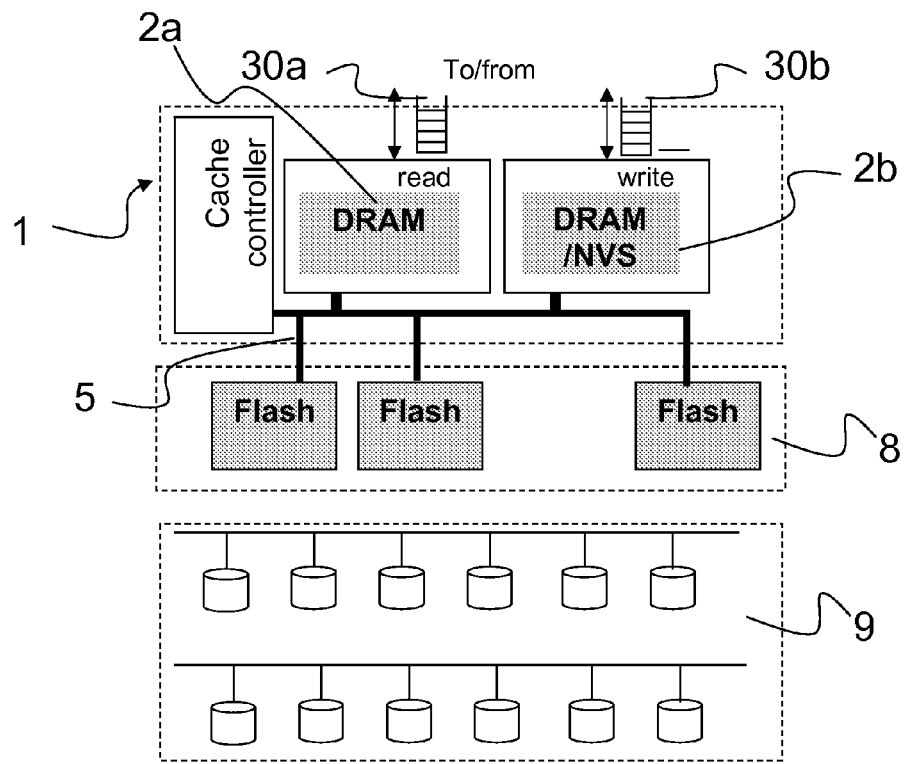
FIG. 2 is an example of data path view of the storage system depicted on FIG. 1.

FIG. 2 depicts an example of data path view of the storage system (or storage system architecture) depicted on FIG. 1. The controller 1 comprises two input/output interfaces 30a and 30b for exchanging data and control signals or only control signals with a host adaptor (not represented on the figure). In practice, the host is a computer from which read/write requests originates and connects to a host adaptor of the storage system. The details of the Input/Output interfaces are not shown in FIG. 2.

The cache controller 1 is further connected to two memories 2a and 2b. In this embodiment, the memories (2a, 2b) are Dynamic Random Access Memory (DRAM), and the memory 2a is responsible for storing the read cache for the whole system, while the memory 2b stores the write cache for the whole system.

Flash memories 8 are connected to the cache controller 1 through the connections 5. Each flash memory 8 belongs to an FCB which comprises at least a flash memory. The cache controller 1 communicates with the FCB using a dedicated interface (not represented) that includes several commands. In addition, the FCB may also communicate with the cache controller using the dedicated interfaces. A flash memory of a FCB is therefore used as a cache extension of the storage system.

FIG. 2 further shows several storage devices which are HDDs. A disk array 9 of the storage system is thus formed. The disk array 9 is connected to the cache controller 1 through connections (not represented).

Figure 3:
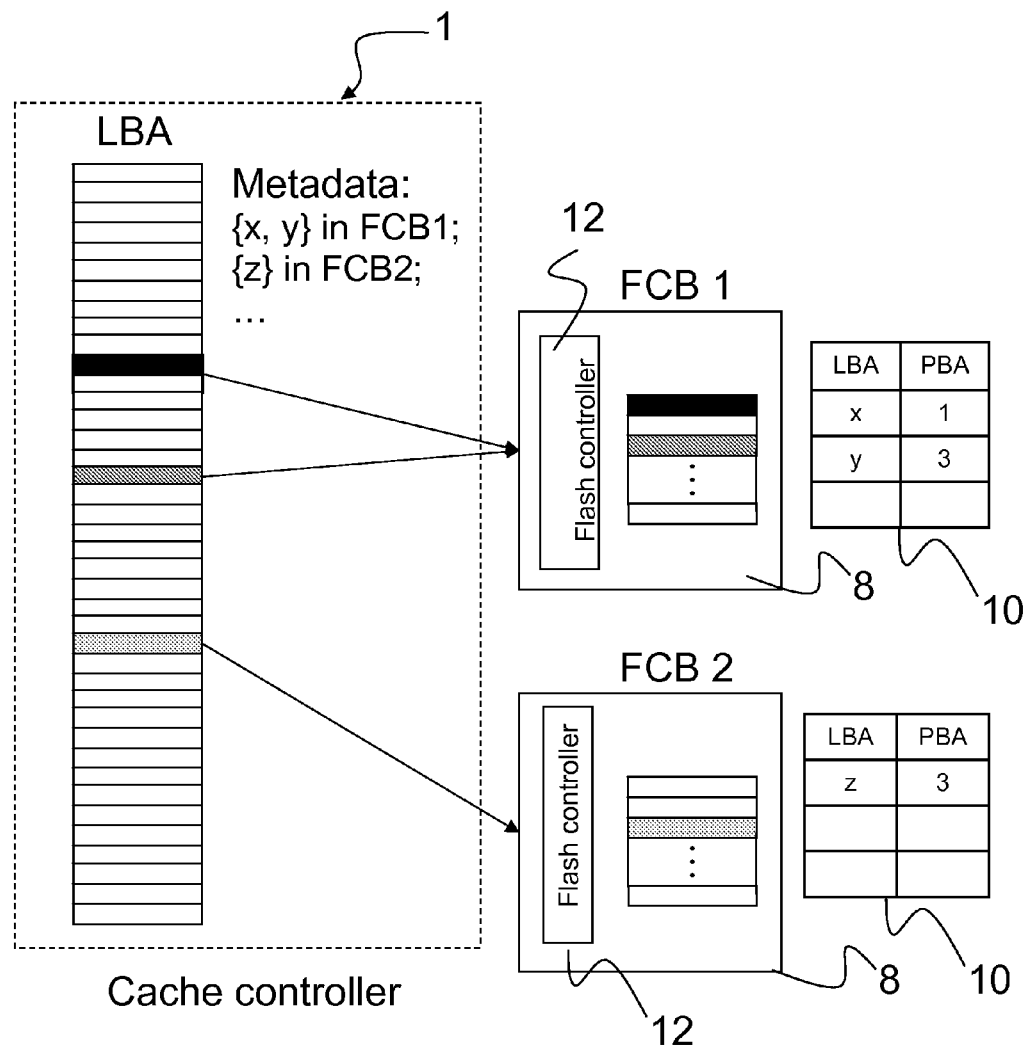
FIG. 3 is a schematic view of flash cache architecture.

Referring now to FIG. 3, the interactions between the cache controller 1 and the flash memories on the FCBs 8 forming the cache extension is now discussed. The cache controller 1 manages which data has to be cached and on which FCB 8 to be cached, an FCB being therefore a cache extension of the storage system.

An FCB 8 is very similar to a "normal" flash SSD as known in the art, except for its address table. Indeed, in a "normal" flash SSD, the address table is essentially a table of contiguous logical block addresses that map to flash physical block addresses (also known as PBA). In a FCB 8, the address table 10 is a table of cached host logical block addressing (LBA) mapped to flash physical block addresses (PBA).

For example, logical block addressing (LBA) is a scheme used for specifying the location of blocks of data stored on storage devices. The addressing scheme is simple: blocks are identified by an index wherein a first data block is LBA=0, a second data block is LBA=1, and so on. The use of LBA enables access to PBA through translation of the physical storage location address to, or from, a logical storage location address.

The cache controller 1 implements cache replacement algorithms. In other words, the cache controller 1 determines which data block addressed by host logical block addressing (LBA) has to be cached.

The cache controller 1 maintains for each FCB connected to the cache controller metadata in the form of a data structure containing information about the set of data blocks that are currently cached on that FCB. Thus, the metadata indicates on which FCB data corresponding to the metadata are cached. For example, on FIG. 3, if the set of data blocks {x, y} is searched, then the metadata indicates that {x, y} are stored on the FCB1. Similarly, if the data block {z} is searched, then the metadata returns FCB2 as storing the searched data block.

Maintaining at the cache controller metadata as described herein allows for efficiently managing cache memory in a flash cache architecture as the address space of FCB's is significantly smaller than that of LBA's in the system. The scalability is notably improved, allowing a large number for FCBs to be integrated without incurring significant metadata overhead on the cache controller. In other words, the additional overhead in the cache controller keeps limited. Moreover, the metadata of the cache address table is managed in a distributed way in each FCB, and the FCB interface remains very simple. The cache controller interacts with an FCB through a very simple interface. Commands between the cache controller and an FCB are the following:

the command put(lba) is used by the cache controller to inform an FCB about the decision to store the data block, e.g., once a data block has been selected by the cache controller to be stored on an FCB;

when a data block is read, the cache controller can check whether there is a cache hit for it by checking its metadata; and if the metadata indicates that the data block is cached in a given FCB, the cache controller issues a command get(lba) to fetch the cached data block from that FCB;

each time the cache controller decides to remove a cached data block from an FCB (provided the data is not "dirty"), the cache controller issues the command invalidate(lba);

whenever the cache controller decides to de-stage a data block that has not been written to disk yet, the cache controller can either obtain the data from the FBC by using the command read(lba), write the data to disk, and then possibly invalidate(lba), or inform the FCB to perform the de-stage itself by issuing the command destage (lba), or possibly the commands destage(lba) and invalidate(lba).

In addition, an FCB may optionally interact with the cache controller. In this case, an FCB may suggest to the cache controller to de-stage a cached data block by issuing a command suggest_destage(lba).

There are several ways how the cache controller allocates cached data blocks to individual FCBs. A simple way is to partition the whole LBA space into multiple sections and to assign one or more sections to each FCB: a data block falling into a given section of the LBA space, will be cached/stored in the associated FCB. This approach significantly reduces the mapping table in the cache controller.

Another way is to replace the mapping table in the cache controller with a hashing function: the destination of a cached data block is determined by the hash value of its LBA.

The present invention is not limited to a specific way of how the cache controller allocates the cache destination for a cached data block. For instance, the allocation may be dynamically determined. The allocation can also be based on a combination of approaches.

The present invention introduces a scalable architecture to perform LBA-to-PBA address translation. The architecture consists of a two-stage approach, as illustrated on FIG. 3. First, an LBA is mapped to one of the FCBs (FCB1, FCB2), and then the one of the FCBs has the actual LBA-to-PBA mapping. Advantageously, the architecture according to the invention allows to integrating a large number of FCBs while still keeping the additional overhead in the cache controller limited: the scalability is improved. Furthermore, metadata can be managed in a distributed way, and thus without incurring significant overhead on the cache controller.

In order to achieve this, two-stage LBA-to-PBA mapping, the cache controller maintains a set of LBA-to-FCB mappings, as shown in FIG. 3. Advantageously, the address space of FCBs is significantly smaller than the real LBA space which is typically 32 or 64 bits. Hence, the size of the mapping table is reduced due to the smaller size of the FCB address space.

In general, the mapping is based on extents of LBA-to-PBA mappings: as usually several subsequent LBAs are written to disk, the extent-based LBA-to-PBA mapping maintains one mapping entry for a whole extent. An extent in file systems is typically a contiguous piece of a file on a computer storage medium and is used in file systems to reduce or eliminate file fragmentation and possibly file scattering. The mapping from extents to the actual PBA is then typically maintained in a B-tree data structure. One disadvantage of extent-based LBA-to-PBA mapping in flash devices is that if one updates data in the middle of an extent, the mapping entry for that extent must be split and new one for the updated data must be created. By doing so, one ends up with 3 entries from one existing one in the worst case. This can significantly increase the overhead of metadata processing: indeed, the extent-based LBA-to-PBA mapping degrades the B-tree structure over time and hence has a significant impact on the drive performance in presence of huge random short writes as the mapping information must be changed for every write operation.

In another embodiment, the mapping LBAs to FCBs is achieved by using another way to reduce the number of mapping entries. The proposed two-stage LBA-to-PBA mapping scheme allows to strictly decouple LBA-to-PBA mapping updates from write operations and allows to manage entries according to meaningful parameters such as the current load on a FCB. To achieve this, the first mapping stage is kept as static as possible. To do so a set of subsequent LBAs are grouped together to build one single mapping table entry similar to an extent (or range) mapping in extent-based (or range-based) LBA-to-PBA mapping. This entry consists of a starting address, a number of subsequent addresses for which this entry is valid, and the actual FCB address, but not the PBAs, to which this entry maps to. In other words, the cache controller maintains ranges (or extents) of LBAs that are allocated to respective FCBs. In addition, the ranges (or extents) of LBAs are dynamically allocated, based on a dynamical parameter such as a workload, e.g., the load on a FCB.

The FCB then maintains the real LBA-to-PBA mapping independent from the LBA-to-FCB mapping. It can be maintained in a sparse data structure such as a B-tree or a simple 1-to-1 mapping table. It is possible to map an LBA to a FCB while this FCB actually doesn't hold an LBA-to-PBA entry for the given LBA. This is typically handled as a cache miss.

Several advantages come together with this scheme. First, it is no longer necessary to update mapping entries in the cache controller for every write operation. Second, the cache controller can easily relocate full or partial mappings to other FCBs or merge adjacent mappings from different FCBs into the same FCB depending on parameters such as the statistical wear of the target FCB or the observed read/write load on the FCB. Third, the number of updates is hence not driven by the workload. Therefore changes can be done deliberately according to meaningful parameters without degrading the performance of the mapping data structure. Moreover, from the cache controller point of view, CPU overhead is reduced and the mapping table maintained by the cache controller is also reduced. Further, it is possible to offload the read cache control to the FCBs. Indeed, although a range mapping for a certain LBA exists, data is not necessarily stored in the FCB resulting in a cache miss when fetching that data from the cache controller.

Hence, one understands that the flexibility is highly increased. Indeed, the cache controller can easily relocate full or partial mappings, and also the cache controller can easily merge adjacent mappings pointing to different FCBs into one FCB. Furthermore, decisions can be based on meaningful measured values such as the statistical wear of the target FCB, the read/write load of the FCBs.

In addition, it is also apparent that such a mapping from LBAs to FCBs allows to reduce resource consumption on the cache controller because less CPU cycles are required in order to maintain the mappings, and the size of the mapping table is smaller.

Figure 4:
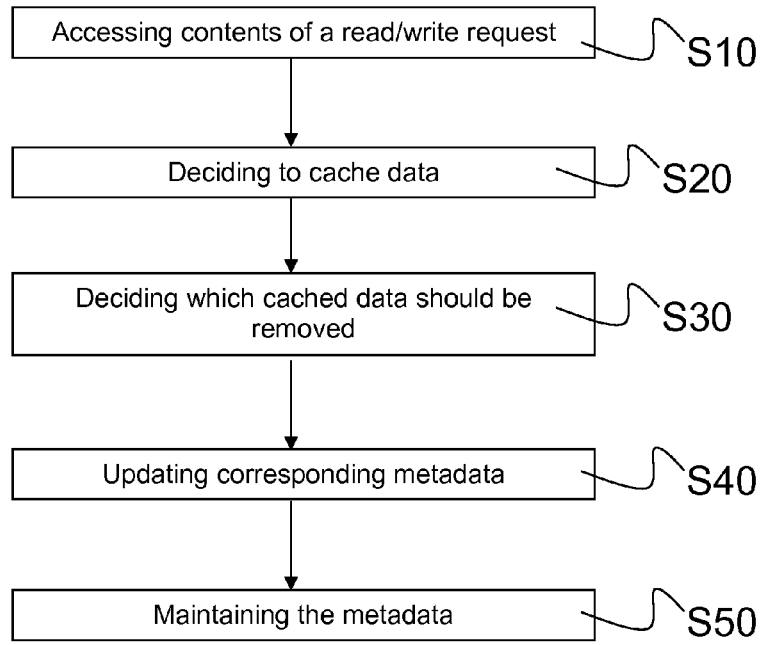
FIG. 4 is a flowchart of an embodiment of a process according to the invention.

FIG. 4 shows a schematic flowchart of managing cache memory in a flash cache architecture, for example according to the embodiment of FIG. 3. The architecture comprises a cache controller and at least two FCBs (FCB1, FCB2), an FCB comprising at least one flash memory and preferably a flash controller.

In an embodiment, each FCB has its own flash controller that implements flash management functions such as garbage collection, wear leveling, etc. This embodiment is represented on FIG. 4 on which the FCB1 and FCB2 have their own flash controller 12.

Advantageously, computational resources of the cache controller are preserved as there is a separate management between cache management and extended cache management: indeed, there is no extra CPU overhead on the cache controller side as the FCB is able to perform by itself management functions.

At step S10, a read/write request originates from a host, e.g., a computer emitting the read/write request. The cache controller receives the request via an input/output which is connected with the memory and the microprocessor.

Upon receiving of the read/write request originating from the host, two steps of deciding S20 and updating S40 are triggered at the cache controller.

In a first time, the cache controller decides S20 whether to cache a given data, e.g., the content of the read/write request. If it is decided not to cache the data, then the process stops.

Then, once the cache controller has decided S20 to cache the given data, it is further decided S30 by the cache controller which cached data should be removed to make room for newly cached data. One understands that it is important to ensure that the FCB, on which the given data are to be cached, has the capability to store the data: indeed, it may happen that the flash memory of the FCB has no more free space left.

Next, the corresponding metadata, which indicate on which FCB the given data are to be cached, is updated S40 at the cache controller side. The cache controller therefore selects the FCB on which the given data are to be cached. Hence, the updating allows ensuring that the cached data can be found in a future request.

Alternatively, once the cache controller has selected the FCB on which the given data are expected to be cached, the flash controller of the selected FCB decides whether to cache the given data. If the selected FCB accepts to cache the given data, then the corresponding metadata is updated S40 accordingly by the cache controller so that the metadata indicates on which selected FCB the given data are to be cached. In the case the selected FCB refuses to store data, then cache controller selects another FCB which decides or not to cache the data. The selection of a FCB is performed until a selected FCB decides to store the data to be cached. Advantageously, it is further decided by the flash controller of the selected FCB which cached data should be removed to make room for newly cached data.

Finally, at step S50, the metadata is maintained so that the cache controller can retrieve at a latter stage the FCB on which the cached data corresponding to the metadata are stored.

The read/write request may originate from a host which may be connected to a processor. The processor may implement the steps of deciding S20 and updating S40. Moreover, the steps of deciding S20, updating S40, and maintaining S50 may be implemented with a processor coupled to the cache controller. For instance, referring to FIG. 1, the processor 2 of the cache controller 1 would perform these three steps (S20, S40, S50).

In another embodiment, none of the FCBs has its own flash controller. In this embodiment, the metadata maintained at the cache controller not only indicate on which FCB the data corresponding to the metadata are cached or expected to be cached, but the metadata also indicate where the cached data are cached inside the FCB. Referring back to FIG. 3, this amounts to say that the metadata maintain a correspondence between LBA and PBA of the FCB. For instance, if the data block {x} is searched, then the metadata indicates that {x} is stored on at the PBA 1. As another example, if the data block {z} is searched, then the metadata returns the PBA 3 as storing the searched data block {z}. In another embodiment, each of the FCBs has an active flash controller. Moreover, in order to maintaining the metadata at the cache controller, additional metadata are maintained at a FCB. The additional metadata indicate where the data corresponding to the metadata or additional metadata are cached inside the FCB. In practice, both the metadata at the cache controller and the additional metadata at a FCB may be maintained concomitant.

In another embodiment, the cache controller delegates cache management functions to FCBs and lets individual FCBs decide which data to be cached and which data to be evicted. The cache controller only keeps a host LBA range for each FCB, and if an LBA falls into that range, it looks up the corresponding FCB for the data. In this way the cache controller offloads cache management to FCBs.

It is to be understood that the described embodiments may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 5:
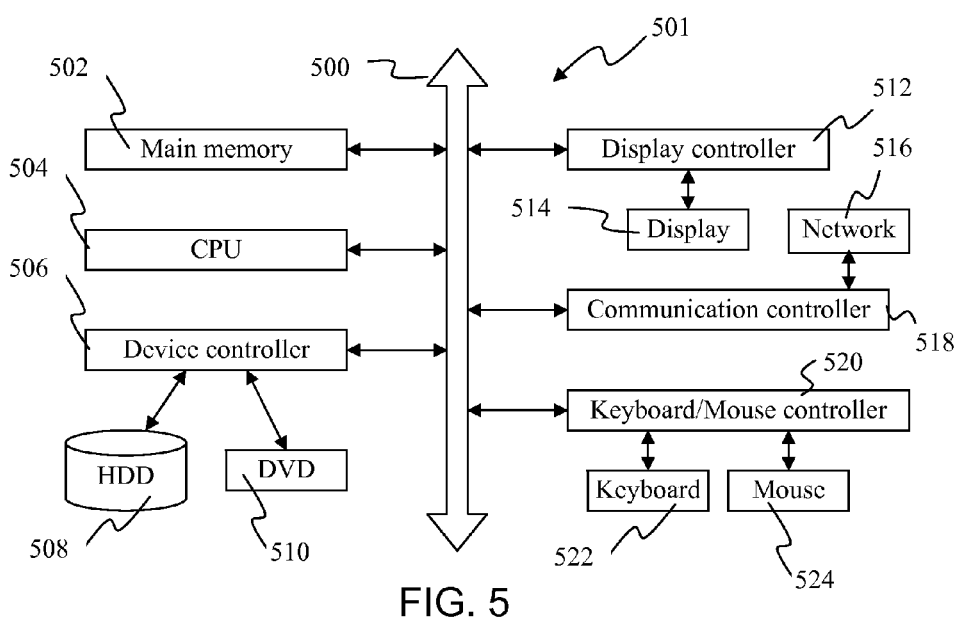
FIG. 5 is a block diagram of computer hardware according to an embodiment of the present invention.

FIG. 5 is a block diagram of computer hardware according to an embodiment of the invention. A computer system (501) according to an embodiment of the invention included a CPU (504) and a main memory (502), which are connected to a bus (500). The bus (500) is connected to a display controller (512) which is connected to a display (514) such as an LCD monitor. The display (514) is used to display information about a computer system. The bus (500) is also connected to a storage device such hard disk (508) or DVD (510) through a device controller (506) such as an IDE or SATA controller. The bus (500) is further connected to a keyboard (522) and a mouse (524) through a keyboard/mouse controller (520) or a USB controller (not shown). The bus is also connected to a communication controller (518) conforms to, for example, an Ethernet (registered trademark) protocol. The communication controller (518) is used to physically connect the computer system (501) with a network (516).

The above described embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing cache memory to cache data units in at least one storage device, comprising:
   providing a cache controller and at least two flash bricks, each comprising a flash memory, coupled to the cache controller;
   maintaining metadata indicating a mapping of the data units to the at least two flash bricks caching the data units, wherein the metadata is used to determine the at least two flash bricks on which the cache controller caches received data units;
   selecting a selected flash brick comprising one of the at least two flash bricks to use to cache the received data units;
   receiving from the selected flash brick indication of whether the selected flash brick will cache the received data units; and
   updating the metadata to indicate the selected flash brick as caching the received data units in response to the receiving the indication from the selected flash brick.

2. The method of claim 1, wherein the cache controller maintains the metadata, further comprising:
   deciding whether to cache received data units, wherein the selected flash brick is selected in response to deciding to cache the received data units.

3. The method of claim 2, wherein deciding whether to cache the received data units further comprises deciding which cached data units should be removed from the flash brick to make room for the received data units to be stored on the flash brick.

4. The method of claim 1, further comprising:
   determining data units cached at the selected flash brick to be removed to make room for the received data units to cache.

5. The method of claim 2, wherein the metadata maintained at the cache controller further indicates physical block addresses in the at least two flash bricks at which data units are cached, wherein the flash controllers determine and maintain the mapping of the data units to the physical block addresses in the flash memories.

6. The method of claim 1, further comprising:
   providing, at the at least two flash bricks, a mapping of data units to physical block addresses (PBAs) in the flash memories of the at least two flash bricks at which the data units are cached;
   forwarding the data units to one of the at least two flash bricks according to the metadata; and
   using, at the flash brick receiving the data units to cache, the mapping of the data units to the PBAs to determine the PBAs to store the data units.

7. The method of claim 1, further comprising:
   allocating ranges of data units in the at least one storage device to the at least two flash bricks based on an operational parameter of the at least two flash bricks.

8. The method of claim 1, wherein the at least two flash bricks include flash controllers, wherein the flash controllers provide a mapping of data units to physical block addresses (PBAs) in the flash memories of the at least two flash bricks at which the data units are cached, wherein the cache controller forwards the data units to one of the at least two flash bricks according to the metadata and wherein the flash controller of the flash brick receiving the data units to cache uses the mapping of the data units to the PBAs to determine the PBAs to store the data units.

9. The method of claim 1, wherein the selected flash brick comprises a first selected flash brick, wherein the cache controller operations further comprise:
   selecting a second selected flash brick comprising one of the at least two flash bricks other than the first selected flash brick on which to cache the received data units in response to the first selected flash brick indicating to not cache the received data units;
   receiving from the second selected flash brick indication of whether the second selected flash brick decided to accept the given data units; and
   updating the metadata for the data units to indicate the second selected flash brick as caching the received data units in response to determining that the second selected flash brick accepts to cache the received data units.

* * * * *